(12) United States Patent  
Liu et al.

(10) Patent No.: US 8,817,507 B2
(45) Date of Patent: Aug. 26, 2014

(54) BATTERY CHARGING SYSTEM

(75) Inventors: Gang Liu, Shanghai (CN); Jin-Fa Zhang, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 399 days.

(21) Appl. No.: 13/269,715

(22) Filed: Oct. 10, 2011

(65) Prior Publication Data

US 2013/0026975 A1    Jan. 31, 2013

(30) Foreign Application Priority Data

Jul. 28, 2011   (CN) .......................... 2011 1 0214088

(51) Int. Cl.
| H02M 7/04 | (2006.01) |
| H02J 7/00 | (2006.01) |
| H02M 7/219 | (2006.01) |
| H02J 7/02 | (2006.01) |

(52) U.S. Cl.
CPC ............... *H02M 7/219* (2013.01); *H02J 7/022* (2013.01)
USPC ............................................ 363/89; 320/109

(58) Field of Classification Search
CPC ................................ H02M 7/219; H02J 7/022
USPC .............. 363/84, 89, 125, 127; 320/104, 109, 320/140, 163
See application file for complete search history.

(56) References Cited

U.S. PATENT DOCUMENTS

| 7,791,310 | B2 * | 9/2010 | Luz et al. ....................... 320/104 |
| 8,125,187 | B2 * | 2/2012 | Tatsumi ......................... 320/132 |
| 8,552,682 | B2 * | 10/2013 | Potter ............................ 320/104 |
| 2010/0019737 | A1 * | 1/2010 | Leboeuf ......................... 320/167 |
| 2011/0156643 | A1 * | 6/2011 | Chen et al. ..................... 320/109 |
| 2013/0193922 | A1 * | 8/2013 | PARK et al. .................... 320/109 |

FOREIGN PATENT DOCUMENTS

| CN | 1819426 A | 8/2006 |
| CN | 101834539 A | 9/2010 |
| EP | 1521353 A | 4/2005 |
| EP | 1679943 A | 7/2006 |

OTHER PUBLICATIONS

State Intellectual Property Office of P.R. China, "Search Report", for Chinese Application No. 2011102140883, Mar. 11, 2014, China.
State Intellectual Property Office of P.R. China, "First Office Action" for Chinese Application No. 201110214088.3, issued on Mar. 25, 2014, China.

\* cited by examiner

*Primary Examiner* — Matthew Nguyen
(74) *Attorney, Agent, or Firm* — Morris Manning & Martin LLP; Tim Tingkang Xia, Esq.

(57) ABSTRACT

In one aspect of the present invention, a battery charging system has a first rectifier adapted for converting an AC voltage at an input thereof to a first DC voltage at an output thereof; a power factor correction (PFC) circuit coupled to the first rectifier, for correcting the power factor of the battery charging system and outputting a second DC voltage; a first power converter coupled to the PFC circuit, for converting the second DC voltage to a third DC voltage; a second power converter coupled to the first power converter, for converting the third DC voltage to a fourth DC voltage to be delivered to a battery; and a first controller adapted for sensing the fourth DC voltage at the output of the second power converter for regulating the second power converter to maintain the fourth DC voltage at a predetermined value.

25 Claims, 7 Drawing Sheets

BATTERY CHARGING SYSTEM

CROSS-REFERENCE TO RELATED PATENT APPLICATION

This application claims priority to and the benefit of, pursuant to 35 U.S.C. §119(a), Chinese patent application No. 201110214088.3, filed Jul. 28, 2011, entitled "BATTERY CHARGING SYSTEM", by Gang Liu and Jin-Fa Zhang, the content of which is incorporated herein by reference in its entirety.

FIELD OF THE INVENTION

The present invention relates to a battery charging system, more particularly to a three-stage battery charging system.

BACKGROUND OF THE INVENTION

It is known that fossil fuels are widely used in traditional automobiles for generating motive force. However, the source of fossil fuels is very limited. Additionally, the use of fossil fuels has caused more and more serious environmental pollution. Recently, electric vehicles and plug-in hybrid electric vehicles have been researched and developed. Electric vehicles and plug-in hybrid electric vehicles use electrical generators to generate motive force. The electric vehicle or a plug-in hybrid electric vehicle has a built-in battery as a stable energy source for providing motive force. And there need a high efficiency, high stability and high security charging system to charge the battery.

Therefore, a heretofore unaddressed need exists in the art to address the aforementioned deficiencies and inadequacies.

SUMMARY OF THE INVENTION

The present invention, in one aspect, relates to a battery charging system. In one embodiment, the battery charging system includes a first rectifier adapted for converting an AC voltage at an input thereof to a first DC voltage at an output thereof, and a power factor correction (PFC) circuit having an input and an output, the input being coupled to the output of the first rectifier, where the PFC circuit is adapted for correcting the power factor of the battery charging system and outputting a second DC voltage at the output thereof. In one embodiment, the PFC circuit has two Boost converters interleaved with each other.

The battery charging system also includes a first power converter having an input and an output, the input being coupled to the output of the PFC circuit, and a second power converter having an input and an output, the input being coupled to the output of the first power converter.

The first power converter is adapted for converting the second DC voltage to a third DC voltage at the output thereof. In one embodiment, the first power converter is configured to isolate the output thereof from the input thereof.

In one embodiment, the first power converter has a transformer having at least one primary winding and at least one secondary winding, where the at least one primary winding of the transformer comprises two or more primary windings connected to each other in series, and the at least one secondary winding of the transformer comprises two or more secondary windings connected to each other in series. The first power converter further has a bridge circuit coupled to the input of the first power converter, where the bridge circuit is a full-bridge circuit. Furthermore, the first power converter has a resonant tank coupled to the bridge circuit and the at least one primary winding of the transformer, where the resonant tank comprises an inductor and a capacitor connected to each other in series. Moreover, the first power converter has a second rectifier coupled to the at least one secondary winding of the transformer and to the output of the first power converter. Also, the first power converter includes a second controller adapted for sensing a voltage at the at least one primary winding of the transformer to regulate the output of the first power converter. Additionally, the first power converter may include a second controller adapted for sensing the input and the output voltage of the first power converter to regulate the output of the first power converter.

The second power converter is adapted for converting the third DC voltage to a fourth DC voltage at the output thereof to be delivered to a battery. In one embodiment, the second power converter is a Buck converter, where the Buck converter comprises two Buck converters interleaved with each other.

Additionally, the battery charging system includes a first controller adapted for sensing the fourth DC voltage at the output of the second power converter for regulating the second power converter to maintain the fourth DC voltage at a predetermined value.

In one embodiment, the first controller is further adapted for sensing an ambient temperature of the battery charging system to protect the battery charging system.

In one embodiment, the battery charging system may further have a first energy-storage capacitor coupled to the output of the PFC circuit. In another embodiment, the battery charging system may also have a second energy-storage capacitor coupled to the output of the first power converter.

In another aspect of the present invention, a battery charging system includes a first rectifier adapted for converting an AC voltage at an input thereof to a first DC voltage at an output thereof; a power factor correction (PFC) circuit having an input and an output, the input being coupled to the output of the first rectifier, wherein the PFC circuit is adapted for correcting the power factor of the battery charging system and outputting a second DC voltage at the output thereof; a first power converter having an input and an output, the input being coupled to the output of the PFC circuit, wherein the first power converter is adapted for converting the second DC voltage to a third DC voltage at the output thereof and includes (i) a bridge-circuit coupled to the input of the first power converter, (ii) a transformer having at least one primary winding and at least one secondary winding, (iii) a resonant tank coupled to the bridge-circuit and the at least one primary winding of the transformer, and (iv) a second rectifier coupled to the at least one secondary winding of the transformer and to the output of the transformer; a second power converter having an input and an output, the input being coupled to the output of the first power converter, wherein the second power converter is adapted for converting the third DC voltage to a fourth DC voltage at the output thereof to be delivered to a battery; and a first controller adapted for sensing the fourth DC voltage at the output of the second power converter for regulating the second power converter to maintain the fourth DC voltage at a predetermined value.

In one embodiment, the first controller is further adapted for sensing an ambient temperature of the battery charging system to protect the battery charging system.

In one embodiment, the first power converter also has a second controller adapted for sensing a voltage at the at least one primary winding of the transformer to regulate the output of the first power converter. In another embodiment, the first power converter has a second controller adapted for sensing the input and the output voltage of the first power converter to regulate the output of the first power converter.

In one embodiment, the second power converter is a Buck converter, wherein the Buck converter includes two Buck converters interleaved with each other.

In one embodiment, the first rectifier includes circuitry to filter and suppress an electromagnetic interference.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment, and wherein.

DETAILED DESCRIPTION OF THE INVENTION

Figure 1:
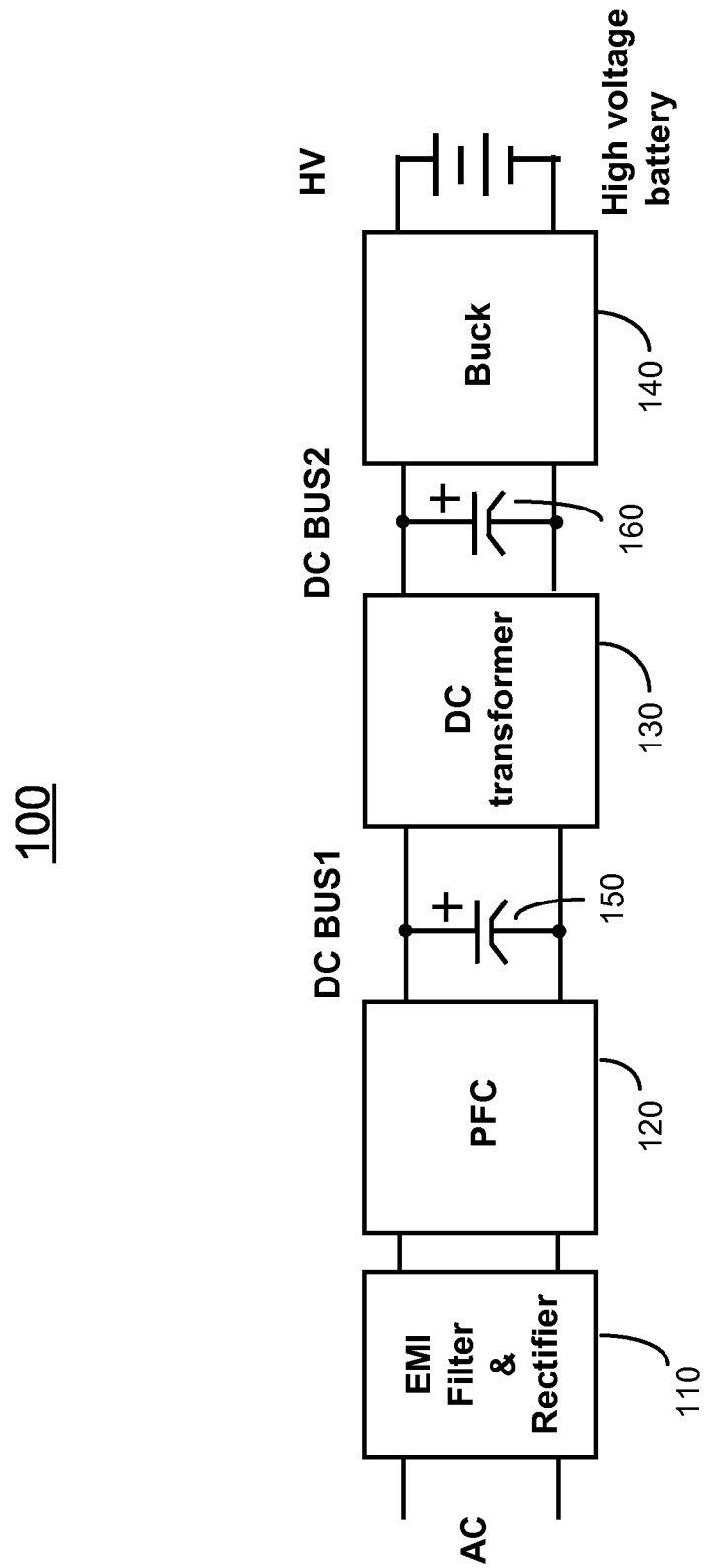
FIG. 1 shows a block diagram of a battery charging system according to one embodiment of the present invention.

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the term "plurality" means a number greater than one.

The description will be made as to the embodiments of the present invention in conjunction with the accompanying drawings in FIGS. 1-7. In accordance with the purposes of this invention, as embodied and broadly described herein, this invention, in one aspect, relates to a battery charging system.

Referring to FIG. 1, a block diagram of the battery charging system 100 is shown according to one embodiment of the present invention. The battery charging system 100 includes an electromagnetic interference (EMI) filter and a rectifier 110, a power factor correction (PFC) circuit 120, a DC transformer 130, and a Buck power converter 140.

The EMI filter and rectifier 110 has an input and an output. The input is adapted for coupling to an AC input voltage source. The EMI filter and rectifier 110 includes circuitry to filter and suppress electromagnetic interference that may be present, and to convert the AC input voltage to a first DC voltage at the output. The PFC circuit 120 has an input and an output. The input is coupled to the output of the EMI filter and rectifier 110. The PFC circuit includes circuitry to correct the power factor of the battery charging system to reduce pollution to the AC input voltage and to output a second DC voltage at the output. The DC transformer 130 has an input and an output. The input is coupled to output of the PFC circuit 120 via a first DC bus. The DC transformer 130 includes circuitry to convert the second DC voltage at the input to a third DC voltage at the output. The DC transformer 130 also provides high frequency isolation between the input and the output. In one embodiment, the DC transformer 130 is a PWM converter. In one embodiment, the DC transformer 130 is a resonant converter. The Buck power converter 140 has an input and an output. The input is coupled to the output of the DC transformer 130 via a second DC bus. The Buck converter 140 includes circuitry to convert the third DC voltage at the input to a fourth DC voltage at the output. The output of the Buck power converter 140 is adapted for coupling to a high voltage battery for charging the battery. The Buck power converter also includes a control circuitry to regulate the fourth DC voltage according to the condition of the high voltage battery. The battery charging system 100 further includes a first energy-storage capacitor 150 and a second energy-storage capacitor 160 coupled to the output of the PFC circuit 120 and the output of the DC transformer 130, respectively.

In one embodiment, the input of the Buck power converter 140 is coupled to output of the PFC circuit 120 via a first DC bus. And the input of the DC transformer 130 is coupled to the output of the Buck power converter 140 via a second DC bus.

In this embodiment, the DC transformer 130 also provides high frequency isolation between the input and the output.

Figure 2:
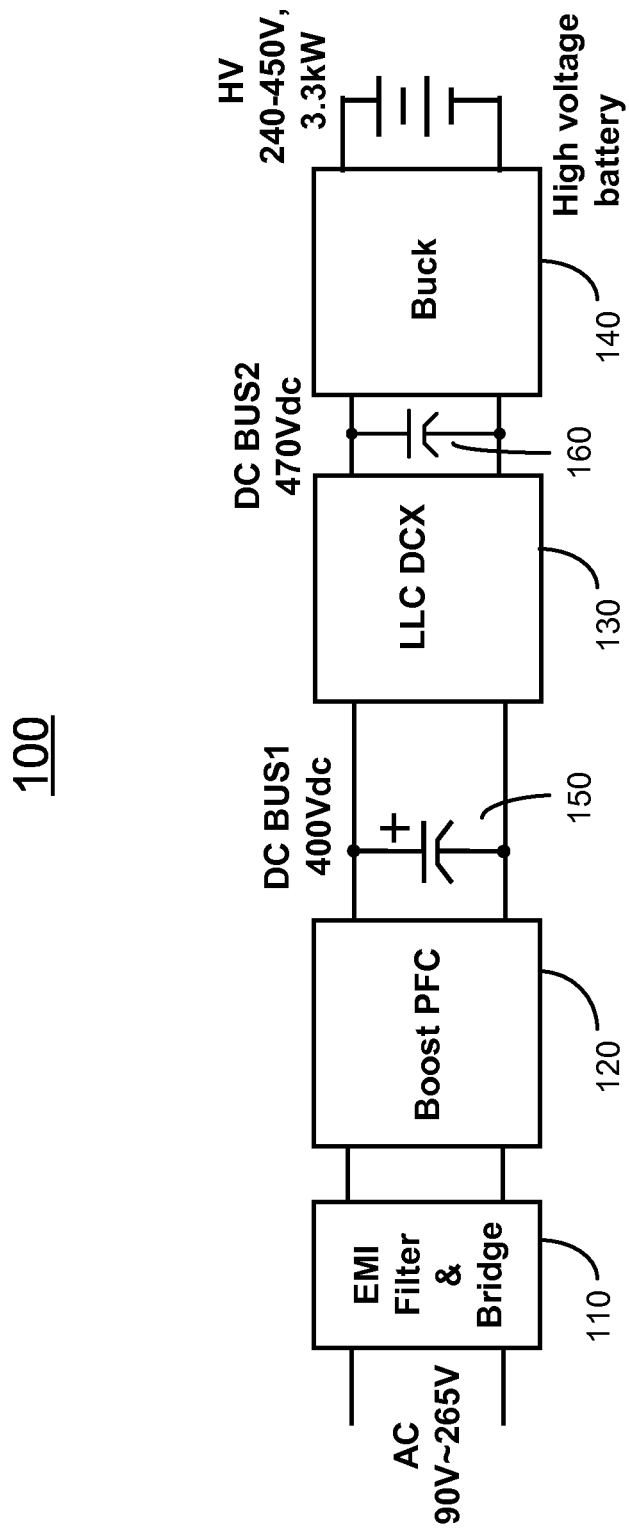
FIG. 2 shows a block diagram of a battery charging system according to another embodiment of the present invention.

FIG. 2 shows a block diagram of the battery charging system 100 according to another embodiment of the present invention. The input voltage to the battery charging system 100 is an AC voltage ranging from about 90 V to about 265 V. The EMI filter and the rectifier 110 comprise a full-bridge or a half-bridge rectifier. The PFC circuit 120 comprises a Boost PFC circuit and is configured to output a second DC voltage of about 400 V to the first DC bus. The DC transformer 130 comprises a serial resonant tank for example a LLC resonant tank, and the DC transformer 130 is configured to output a third DC voltage of about 470 V to the second DC bus. The Buck power converter 140 is configured to convert the third DC voltage into a fourth DC voltage ranging from about 240 V to about 450V, thereby providing a power of approximately 3.3 kW to a high voltage battery.

Figure 3:
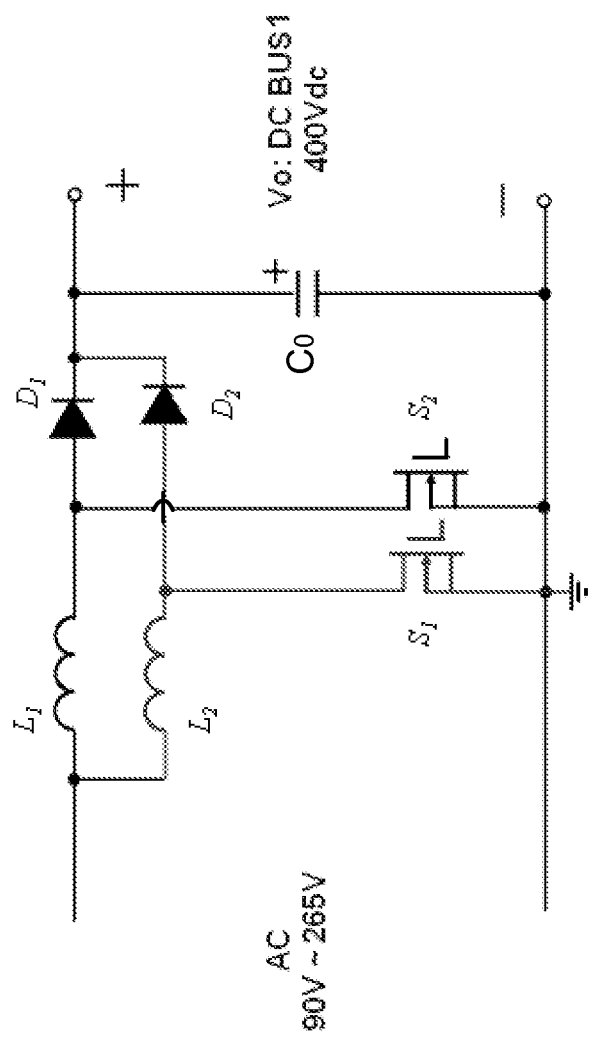
FIG. 3 shows a circuit diagram of a power factor correction (PFC) circuit used in the battery charging system shown in FIG. 2, according to one embodiment of the present invention.

FIG. 3 shows a circuit diagram of a Boost PFC circuit 120 according to one embodiment of the present invention. The Boost PFC circuit 120 comprises two Boost circuits interleaved with each other. Each Boost circuit includes an inductor L1/L2, a transistor S1/S2, and a diode D1/D2. The Boost PFC circuit 120 increases the power factor of the battery charging system and outputs a second DC voltage of about 400 V. The interleaved Boost PFC circuit can also reduce ripple of the output voltage with a high power factor.

In one embodiment, the PFC circuit 120 can be a single Boost circuit to correct the power factor of the battery charging system. And in one embodiment, the PFC circuit 120 can be more than two Boost circuits interleaved to each other to correct the power factor of the battery charging system.

Figure 4:
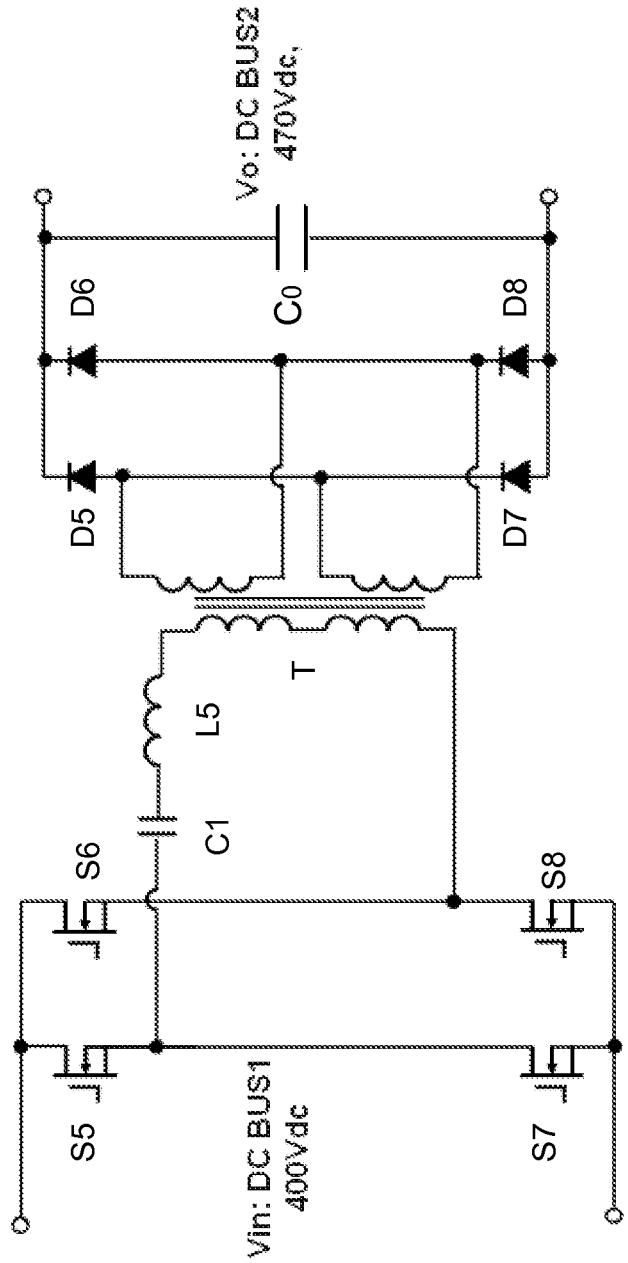
FIG. 4 shows a circuit diagram of a resonant DC transformer used in the battery charging system shown in FIG. 2, according to one embodiment of the present invention.

FIG. 4 shows a circuit diagram of the DC transformer 130 according to one embodiment of the present invention. The DC transformer 130 includes a full-bridge circuit comprising four transistors S5-S8 coupled to the second DC voltage via the first energy-storage capacitor. In an alternative embodiment, the DC transformer 130 may comprise a half-bridge circuit. The DC transformer 130 further includes a transformer T comprising at least one primary winding and at least one secondary winding. The at least one primary winding is coupled to the full-bridge circuit via a serial resonant tank. The serial resonant tank comprises a capacitor C1 and an inductor L5 connected to each other in series. In one embodiment, the serial resonant tank further comprises a primary winding leakage inductor to form a LLC resonant circuit. The at least one secondary winding of the transformer T is coupled to the output via a full-bridge rectifier comprising four diodes D5-D8. In one embodiment, the at least one primary winding of the transformer T comprises two or more primary windings connected to each other in series, and the at least one secondary winding of the transformer T comprises two or more secondary windings connected to each in series. In one embodiment, the DC transformer 130 is an unregulated converter. In one embodiment, the DC transformer 130 is a semi-regulated converter. And in another embodiment, the DC transformer 130 is a regulated converter.

Figure 5:
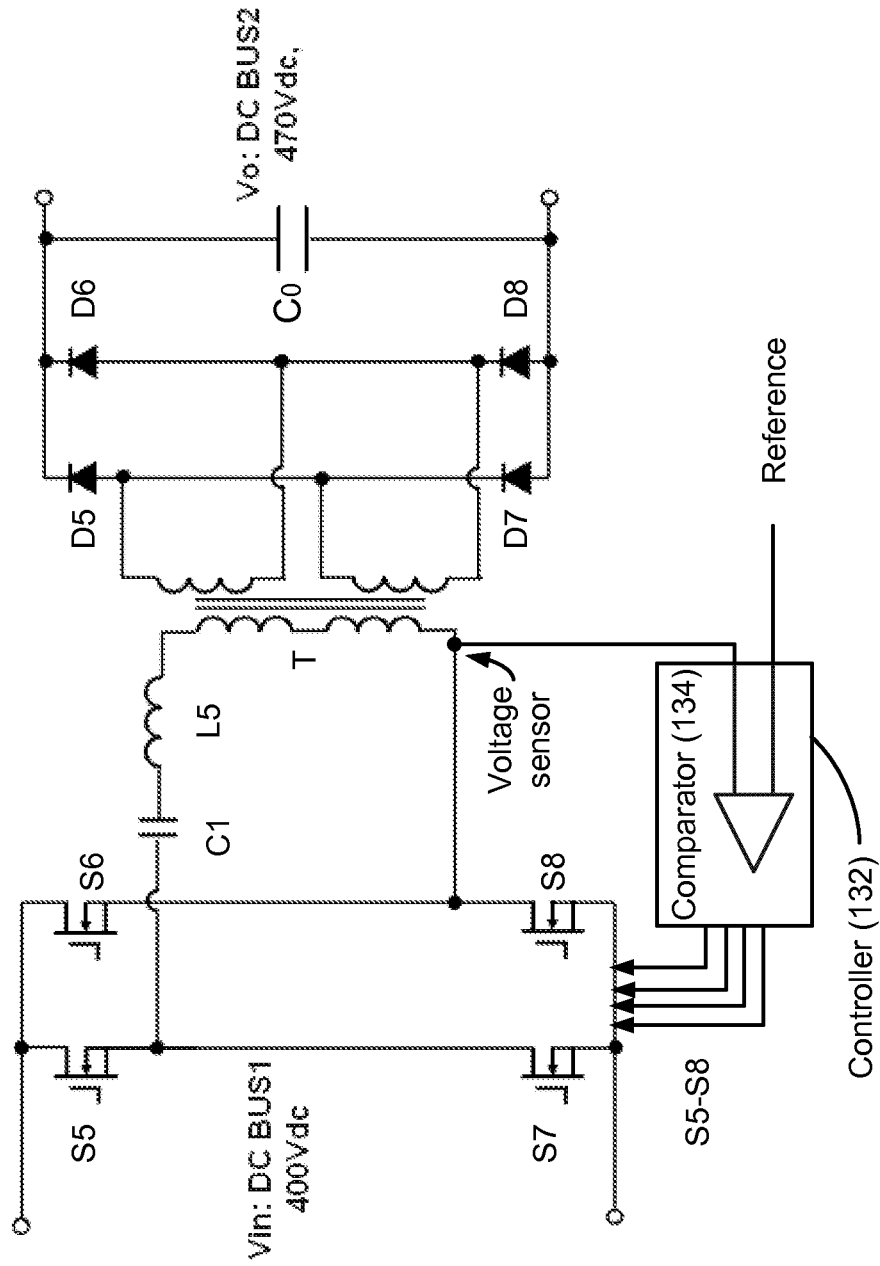
FIG. 5 shows a circuit diagram of a semi-regulated resonant DC transformer used in the battery charging system shown in FIG. 2, according to another embodiment of the present invention.

FIG. 5 shows a circuit diagram of the DC transformer 130' according to another embodiment of the present invention. The DC transformer 130' is similar to the DC transformer 130 shown in FIG. 4 except that it further includes a controller 132. The controller 132 comprises a comparator 134. A first input of the comparator 134 is coupled to a voltage sensor that samples a voltage at the at least one primary winding of the transformer T. A second input of the comparator 134 is coupled to a reference voltage. The comparator 134 is configured to compare the sampled voltage to the reference voltage and to output a control signal according to the result of the comparison to control the four transistors S5-S8 in the full-bridge circuit. The control signal may comprise four individual signals for controlling each of the four transistors S5-S8 individually. The DC transformer 130' according to this embodiment is semi-regulated.

Figure 6:
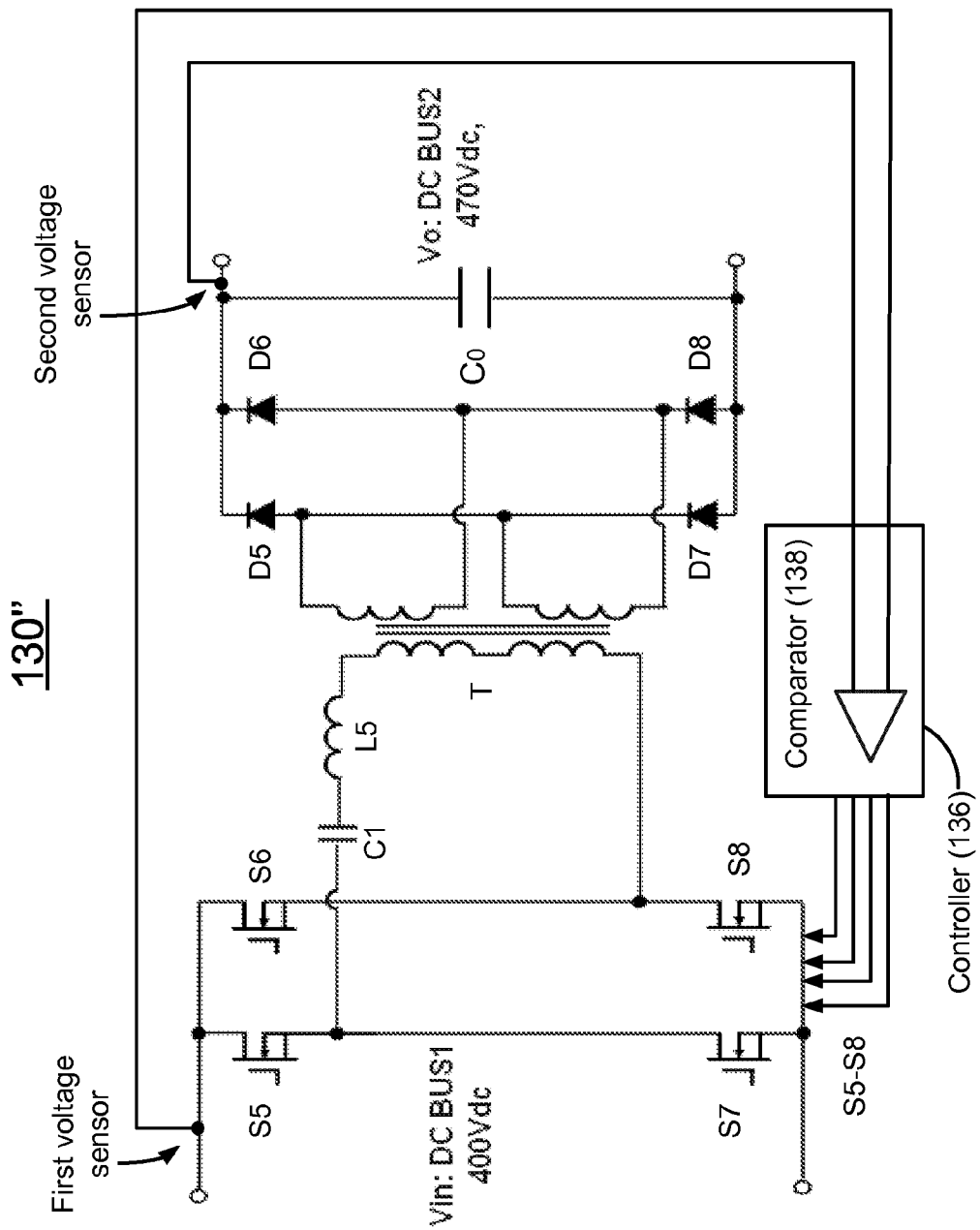
FIG. 6 shows a circuit diagram of a regulated resonant DC transformer used in the battery charging system shown in FIG. 2, according to yet another embodiment of the present invention.

FIG. 6 shows a circuit diagram of the DC transformer 130" according to yet another embodiment of the present invention. The DC transformer 130" is similar to the DC transformer 130 shown in FIG. 4 except that it further includes a controller 136. The controller 136 comprises a comparator 138. A first input of the comparator 138 is coupled to a first voltage sensor that samples the input voltage of the DC transformer 130". A second input of the comparator 138 is coupled to a second voltage sensor that samples the output of the DC transformer 130". The comparator 138 is configured to compared the sampled input voltage of the DC transformer 130" and the sampled output voltage of the DC transformer 130" and to output a control signal according to result of the comparison to control the four transistors S5-S8 in the full-bridge circuit. The control signal may comprise four individual signals for controlling each of the four transistors S5-S8 individually. The DC transformer 130" according to this embodiment is capable of providing a highly stable output voltage.

Figure 7:
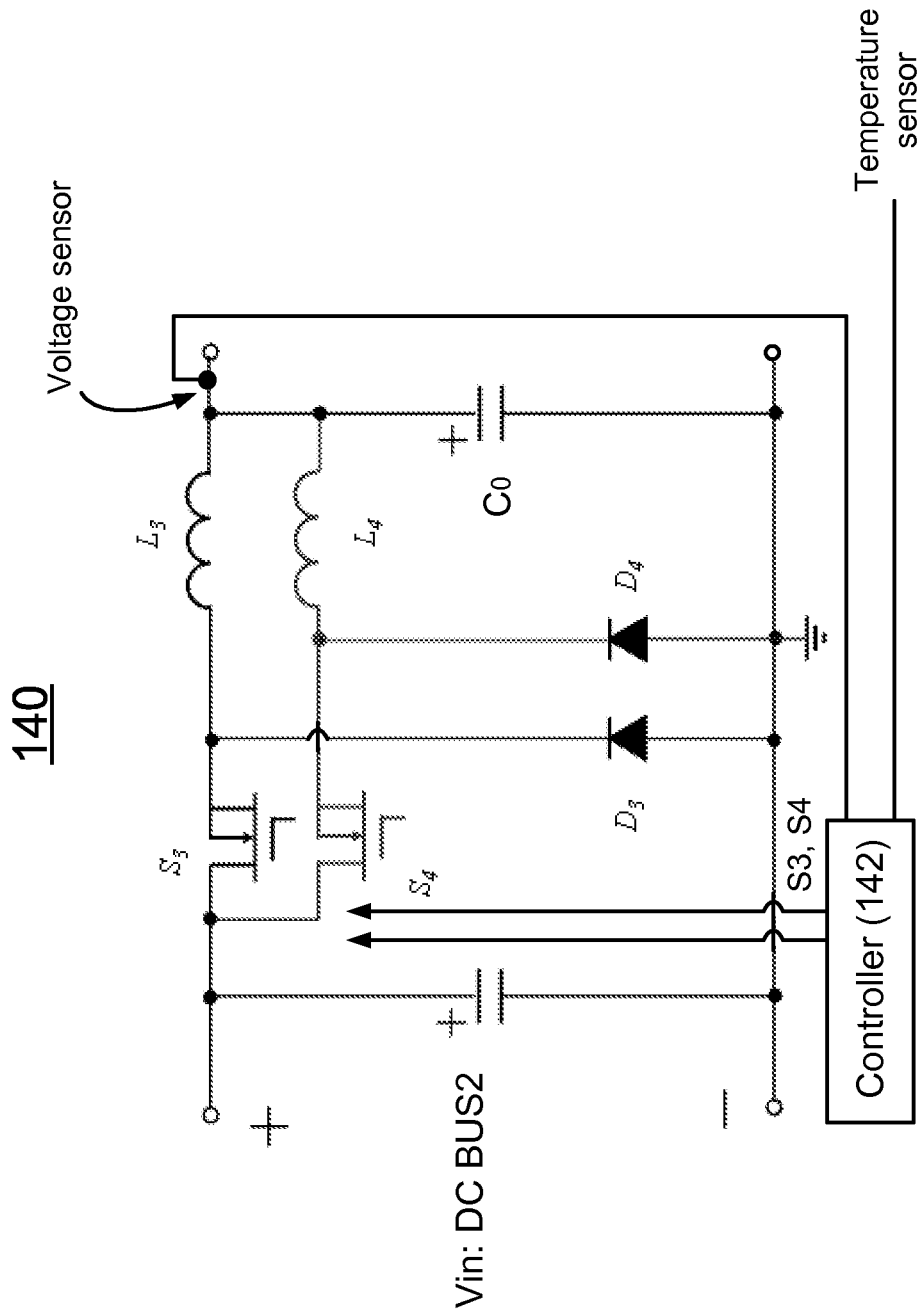
FIG. 7 shows a circuit diagram of a Buck power converter used in the battery charging system shown in FIG. 2, including a control, according to one embodiment of the present invention.

FIG. 7 shows a circuit diagram of the Buck power converter 140 according to one embodiment of the present invention. The Buck power converter 140 comprises two Buck converters interleaved with each other. Each Buck converter comprises a transistor S3/S4, an inductor L3/L4, and a diode D3/D4. The Buck power converter 140 also includes a controller 142. The controller 142 has a first input that is coupled to a voltage sensor for sampling the output voltage of the battery charging system 100. The controller 142 is configured to output a first control signal according to the sampled output voltage to regulate the transistors S3 and S4, thereby to maintain the output voltage at a predetermined value. The first control signal may comprise two signals for controlling each of the transistors S3 and S4 individually. The controller 142 further has a second input coupled to a temperature sensor for sampling the ambient temperature of the battery charging system. The controller 142 is configured to output a second control signal according to the sampled temperature to protect the battery charging system 100.

In one embodiment, the Buck power converter 140 may comprise a single Buck circuit to convert the third DC voltage to the fourth output voltage which suitable to charge the battery of the charging system. And in one embodiment, the Buck power converter 140 may comprise more than two Buck circuits interleaved to each other to convert the third DC voltage to the fourth output voltage which suitable to charge the battery of the charging system.

In summary, a three-stage battery charging system for charging an electric vehicle battery is described. The battery charging system provides efficient power factor correction, isolation of the battery from the power source, and a highly regulated output voltage. The battery charging system further provides protection when the battery being charged is overheated.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A battery charging system, comprising:
   (a) a first rectifier adapted for converting an AC voltage at an input thereof to a first DC voltage at an output thereof;
   (b) a power factor correction (PFC) circuit having an input and an output, the input being coupled to the output of the first rectifier, wherein the PFC circuit is adapted for correcting the power factor of the battery charging system and outputting a second DC voltage at the output thereof;
   (c) a first power converter having an input and an output, the input being coupled to the output of the PFC circuit, wherein the first power converter is adapted for converting the second DC voltage to a third DC voltage at the output thereof;
   (d) a second power converter having an input and an output, the input being coupled to the output of the first power converter, wherein the second power converter is adapted for converting the third DC voltage to a fourth DC voltage at the output thereof to be delivered to a battery; and
   (e) a first controller adapted for sensing the fourth DC voltage at the output of the second power converter for regulating the second power converter to maintain the fourth DC voltage at a predetermined value;
   wherein one of the first power converter and the second power converter is an isolated converter.

2. The battery charging system of claim 1, wherein the first controller is further adapted for sensing an ambient temperature of the battery charging system to protect the battery charging system.

3. The battery charging system of claim 1, wherein the second power converter is a Buck converter.

4. The battery charging system of claim 3, wherein the Buck converter comprises two Buck converters interleaved with each other.

5. The battery charging system of claim 1, wherein the first power converter is configured to isolate the output thereof from the input thereof.

6. The battery charging system of claim 5, wherein the first power converter comprises a transformer having at least one primary winding and at least one secondary winding.

7. The battery charging system of claim 6, wherein the at least one primary winding of the transformer comprises two or more primary windings connected to each other in series, and the at least one secondary winding of the transformer comprises two or more secondary windings connected to each other in series.

8. The battery charging system of claim 6, wherein the first power converter further comprises a bridge circuit coupled to the input of the first power converter.

9. The battery charging system of claim 8, wherein the bridge circuit is a full-bridge circuit.

10. The battery charging system of claim 8, wherein the first power converter further comprises a resonant tank coupled to the bridge circuit and the at least one primary winding of the transformer.

11. The battery charging system of claim 10, wherein the resonant tank comprises an inductor and a capacitor connected to each other in series.

12. The battery charging system of claim 6, wherein the first power converter further comprises a second rectifier coupled to the at least one secondary winding of the transformer and to the output of the first power converter.

13. The battery charging system of claim 6, wherein the first power converter further comprises a second controller adapted for sensing a voltage at the at least one primary winding of the transformer to regulate the output of the first power converter.

14. The battery charging system of claim 6, wherein the first power converter further comprises a second controller adapted for sensing the input and the output voltage of the first power converter to regulate the output of the first power converter.

15. The battery charging system of claim 1, wherein the PFC circuit comprises two Boost converters interleaved with each other.

16. The battery charging system of claim 1, further comprising a first energy-storage capacitor coupled to the output of the PFC circuit.

17. The battery charging system of claim 15, further comprising a second energy-storage capacitor coupled to the output of the first power converter.

18. The battery charging system of claim 1, wherein the first rectifier includes circuitry to filter and suppress an electromagnetic interference.

19. A battery charging system, comprising:
   (a) a first rectifier adapted for converting an AC voltage at an input thereof to a first DC voltage at an output thereof;
   (b) a power factor correction (PFC) circuit having an input and an output, the input being coupled to the output of the first rectifier, wherein the PFC circuit is adapted for correcting the power factor of the battery charging system and outputting a second DC voltage at the output thereof;
   (c) a first power converter having an input and an output, the input being coupled to the output of the PFC circuit, wherein the first power converter is adapted for converting the second DC voltage to a third DC voltage at the output thereof and providing high frequency isolation and includes (i) a bridge-circuit coupled to the input of the first power converter, (ii) a transformer having at least one primary winding and at least one secondary winding, (iii) a resonant tank coupled to the bridge-circuit and the at least one primary winding of the transformer, and (iv) a second rectifier coupled to the at least one secondary winding of the transformer and to the output of the transformer;
   (d) a second power converter having an input and an output, the input being coupled to the output of the first power converter, wherein the second power converter is adapted for converting the third DC voltage to a fourth DC voltage at the output thereof to be delivered to a battery; and
   (e) a first controller adapted for sensing the fourth DC voltage at the output of the second power converter for regulating the second power converter to maintain the fourth DC voltage at a predetermined value.

20. The battery charging system of claim 19, wherein the first controller is further adapted for sensing an ambient temperature of the battery charging system to protect the battery charging system.

21. The battery charging system of claim 19, wherein the second power converter is a Buck converter.

22. The battery charging system of claim 21, wherein the Buck converter comprises two Buck converters interleaved with each other.

23. The battery charging system of claim 19, wherein the first power converter further comprises a second controller adapted for sensing a voltage at the at least one primary winding of the transformer to regulate the output of the first power converter.

24. The battery charging system of claim 19, wherein the first power converter further comprises a second controller adapted for sensing the input and the output voltage of the first power converter to regulate the output of the first power converter.

25. The battery charging system of claim 19, wherein the first rectifier includes circuitry to filter and suppress an electromagnetic interference.

\* \* \* \* \*